United States Patent

[11] 3,602,792

[72] Inventor Charles E. Engle
 Tustin, Calif.
[21] Appl. No. 848,199
[22] Filed Aug. 7, 1969
[45] Patented Aug. 31, 1971
[73] Assignee Community Bank
 Downey, Calif.

[54] SERVOSYSTEM FOR ANALOGUE PLOTTERS
 3 Claims, 3 Drawing Figs.

[52] U.S. Cl. .................................................... 318/668,
 318/621, 318/666
[51] Int. Cl. .................................................... G05b 1/06
[50] Field of Search ........................................... 318/666,
 621, 668

[56] References Cited
 UNITED STATES PATENTS
2,656,498 10/1953 Goodwin ...................... 318/666
3,398,341 8/1968 Dooley et al. ................. 318/621

Primary Examiner—T. E. Lynch
Attorney—Nilsson, Robbins, Wills and Berliner

ABSTRACT: Position input signals are conditioned to be applied at a level of at least several volts to a summing junction for comparison with a similarly scaled feedback signal to generate an error signal for driving a servomotor to position the marking means. The servomotor at the same time positions a movable tap on a follow up potentiometer that provides an output voltage representative of the instantaneous position of the marking means. This output voltage is applied to the input of a buffering operational amplifier that supplies its output through a phase lead network to develop a feedback signal that prevents the marking means from overshooting the desired position. Thus the DC component of the feedback signal is maintained at a relatively high level for comparison at the summing junction to minimize the effect of high frequency transients and reduce system instability, while the high input impedance of the operational amplifier buffer prevents potentiometer loading errors.

INVENTOR.
CHARLES E. ENGLE
BY Nilsson & Robbins
Attorneys

SERVOSYSTEM FOR ANALOGUE PLOTTERS

BACKGROUND OF THE INVENTION

1. Field of the Invention

This invention relates to servo positioning systems, and more particularly, to improved positioning systems for controlling analogue graphical plotters and recorders.

2. Description of the Prior Art

Line plotters and graphical recorders are widely employed to visually represent or record certain phenomena that can be represented in graphical form. Such recorders and plotters employ a stylus movable relative to a recording medium and typically mounted on a carriage assembly that is positionable in one or more coordinate directions by servosystems responsive to electrical position input signals received from an appropriate source. The stylus contacts the recording medium, such as a strip of graph paper or the like, and is moved across it in one or more coordinate directions to produce a visual trace on the recording medium.

Analogue line plotters and graphical recorders employ a separate positioning servosystem for each coordinate direction. Each servosystem positions the stylus along a particular coordinate with respect to a zero reference position in response to the polarity and amplitude of an input positioning signal. The stylus with its carriage is moved along the selected coordinate as the input level of the positioning signal changes. To accomplish this the level of the applied positioning signal indicating the desired position is continuously compared with a feedback signal indicative of the actual position of the stylus to produce an error signal that actuates a servomotor coupled to drive the carriage toward the desired position in the selected coordinate position. The motor also drives a movable tap on a followup potentiometer to give an output voltage representative of the present carriage position. This output voltage is fed back for comparison with the input signal at a summing junction to develop the error signal that continues to drive the motor until the output matches the input when the desired position has been reached.

The mechanical inertia of the motor and carriage assembly tends to cause overshooting and subsequent oscillation of the stylus about the selected position. This overshoot effect cannot be tolerated in a graphical plotter since it would produce erroneous markings. Accordingly, the servosystem response had been damped to prevent overshooting by incorporating a phase lead circuit in the output feedback path. This increases the voltage feedback from the output potentiometer in the direction of change by an additional amount that results from differentiating the output voltage. Thus, a combined feedback signal is generated that reduces the error signal to prevent overshoot and oscillation.

Such systems must frequently operate with very low level input voltages, sometimes no more than several millivolts with resolution of a few microvolts. In prior art systems, these input voltages along with the feedback signal are applied to a summing junction to be compared with a feedback signal that is attenuated to a correspondingly low level. The resulting low level DC error signal is converted to an alternating current signal by a chopper or other type of modulator so that it be amplified sufficiently to supply operating power to the servomotor.

Such prior systems lacked stability and were subject to severe overloading from high frequency voltage transients generated as the wiper arm contact moved along the followup potentiometer since the required phase lead network in the feedback path provided a low impedance path for transmission of these high frequency transients, which were in effect differentiated to produce high amplitude voltage spikes at the summing junction. Because of the high gain of the AC amplifier needed to increase the low error signal level to a voltage of sufficient magnitude to drive the servomotor, the presence of these relatively high amplitude spikes in the feedback signal could easily cause amplifier saturation along with serious instability problems in overall system operation.

SUMMARY OF THE INVENTION

The system of this invention employs direct current operational amplifiers to increase the voltage level of the input signal to a level comparable to that of the output signal from the potentiometer, so that the feedback signal can be maintained at a similar level for a comparison. The input signal and the feedback signal can then be compared in a summing junction at relatively high voltage levels to produce an error signal that can be modulated to provide an alternating error signal of substantial magnitude. In this way, an alternating current of sufficient magnitude to operate the servomotor can be obtained with an amplifier having only moderate gain. Thus, the effect of high frequency transients from the followup potentiometer are minimized to achieve higher signal-to-noise ratios for increased system stability.

More particularly, the system of this invention also employs an active feedback network that includes an operational amplifier coupled to the movable tap on the followup potentiometer to provide an output signal voltage indicative of the stylus position along a given coordinate axis. The amplified output voltage is applied to one of the inputs of another operational amplifier where it is compared with an adjustable zero reference voltage applied to the other input from another operational amplifier. The difference between the zero reference and the output signal voltage indicates the actual displacement of the stylus from the selected zero reference position along the particular coordinate axis with the signal polarity indicating the direction of displacement. The high input impedance of these operational amplifiers virtually eliminates linearity errors due to potentiometer loading. Since the output voltage is maintained at a relatively high level, high frequency transients from the followup potentiometer are not passed at a disproportionately high level to the summing junction through the phase lead network, as compared with the DC voltage component of the feedback voltage. In addition, since the alternating current amplifier for the error signal need only have moderate gain it will not be driven to saturation by the feedback transients, thus improving system stability.

DESCRIPTION OF PREFERRED EMBODIMENT

Figure 1:
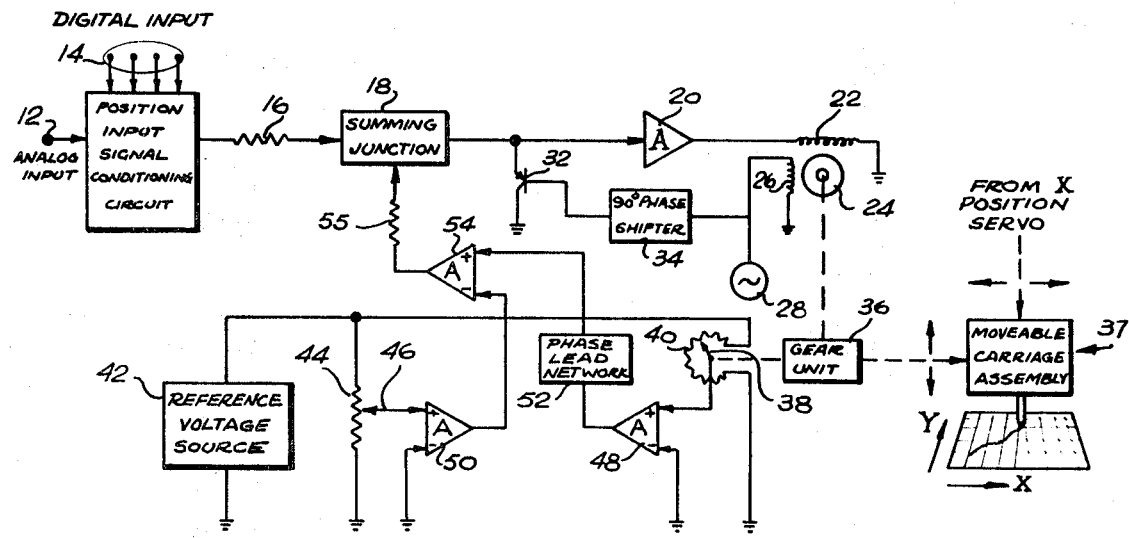
FIG. 1 is a schematic circuit diagram of an improved servosystem in accordance with the invention for use in analogue plotters and graphical recorders.

Referring now to the FIG. 1 in which the basic elements of a system in accordance with the invention are shown schematically, a position input signal conditioning circuit 10 receives an input positioning signal, such as an analogue voltage at the input 12 or a digital input on the multiple input lines 14. Typically, the voltage at the analogue input 12 may be generated by a transducer, such as a strain gage, that monitors the particular phenomena to be recorded. Alternatively, a digital input on the lines 14 might be obtained from a computer output or the like so that the computed solution may be graphically illustrated. The input signal condition circuit 10 would in either case contain appropriate circuitry for converting the particular analogue or digital input signal to an appropriately scaled input voltage signal to be applied through a resistor 16 to a summing junction 18 for the operation of the plotter mechanism.

The circuit components employed in position input signal conditioning circuit 10 may take any appropriate form depending on the nature and level of the applied input signals, so as to provide a full scale input to the summing junction for comparison with the feedback input. For very low level position input signals, the conditioning circuit 10 would include a direct current amplifier (not shown) for increasing its initial low voltage level, which may be only several millivolts at full scale, to a full scale output level of several volts. Preferably an operational amplifier having high input impedance and very high gain characteristics might be used for this purpose.

The conditioned input signal is compared with a feedback signal to develop a DC error signal at summing junction 18 having its amplitude indicative of the displacement between the present stylus position and the desired position indicated by the input signal and its polarity either positive or negative depending upon the direction of the displacement. This DC error signal is modulated to generate an alternating current error signal with its amplitude indicative of the displacement and with one of two opposite phases corresponding to the direction of the displacement. A conventional AC amplifier 20 amplifies the resulting alternating current error signal to be applied to one of the phase windings 22 of a conventional two phase induction motor 24 in time phase quadrature with alternating current being supplied through its other phase winding 26 from a source 28.

In FIG. 1, the error signal from the summing junction 18 is coupled to a modulating switch arrangement, which is shown in FIG. 1 in simplified form as a single PNP switching transistor 32 that receives an alternating current signal at its base from the source 28 through a 90° phase shift network 34. The modulating switch represented by transistor 34 with its collector grounded is actuated upon each negative half cycle of the AC signal at its base to conduct in saturation thus holding the potential at its emitter at or near ground during alternate half cycles. Thus, if the DC error signal voltage at summing junction 18 has a positive polarity with respect to ground potential, the repetitive grounding through the switching transistor 32 produces an alternating voltage in phase opposition to, that is, 180° out of phase with, that resulting from a negative error signal, so that the driving current supplied from the amplifier 20 through motor winding 22 will either lead or lag by 90° the current through the other motor winding 26, thus driving the motor 24 in the desired forward or reverse direction.

An output shaft from the motor 24 operates through gears 36, or other appropriate power transfer arrangements, to drive the movable carriage on the graphic analogue plotter or recorder 37 to move the stylus in the selected Y coordinate direction towards the desired position indicated by the stylus positioning. Of course, in the other, X coordinate, direction on the recording medium the stylus is controlled by a similar servosystem. At the same time, the gears 36 drive a movable contact 38 on followup potentiometer 40 to provide an output signal voltage indicative of the instantaneous position of the carriage. Preferrably the followup potentiometer 40 may be of single turn, nonwire type that provides a relatively linear voltage change during movement of the tap 38. The potentiometer 40 is coupled across a reference voltage source 42, which may be either interior or exterior, and provides fixed regulated voltage at a level sufficient for proper operation of the followup potentiometer 40. Reference voltage 42 is also applied across zero reference potentiometer 44 with a movable tap 46 that permits selection of a zero reference position for each coordinate in the particular graphing or recording operation.

The output voltage from the movable tap 38 on the output potentiometer 40 is coupled to the positive input terminal of a direct current operational amplifier 48 that has its negative input terminal connected to ground potential. Likewise, the zero reference voltage provided on the movable tap 46 of the potentiometer 44 is applied to the positive input terminal grounded. The high input impedance of the operational amplifier 48 and 50 which may typically be several megohms or more practically eliminates any output loading on the potentiometers. To provide the necessary system damping, a phase lead network 52 is connected with the operational amplifier 48 to provide a feedback signal to the summing junction 18 that has an additional component obtained by differentiating the output voltage. This reduces the error signal by an amount proportional to the motor speed and, since the torque and speed of the motor is proportional to the error signal, this serves to slow the motor sufficiently to prevent the carriage from overshooting the desired position. The signal voltage developed by the phase lead network is applied to the positive terminal of another operational amplifier 54, that has its negative terminal connected to receive the zero reference signal produced at the output of the operational amplifier 50. The resulting feedback voltage from the output of the operational amplifier 54 supplied to the summing junction 18 has a level proportional to the difference between the zero reference signal applied to its negative terminal and the feedback signal applied to its positive terminal.

In operation, assume that at the start of a plotting operation with no input being received by the position input signal conditioning circuit 10, the recorder carriage is positioned with the stylus at the zero coordinate point on the recording medium, typically a lined graph paper or the like. This zero position along the particular coordinate has been preselected by setting the movable tap 46 on the zero reference potentiometer 44 to move the stylus to the selected zero line on the recording medium. This provides plotting versatility since the zero coordinate positions may be varied in accordance with the particular plotting or recording operation to be performed, and slight adjustments can be made to compensate for misalignment of the recording medium or variations in the graphical line pattern. Under these conditions, the output voltage on the movable tap 38 on the followup potentiometer 40 exactly matches that at the movable contact 46 of the zero reference potentiometer 44 so that, with the amplifiers 48 and 50 having equal gain, the steady state voltages produced at their outputs are equal. Alternatively, should the followup and zero reference potentiometers 40 and 44 be operated with different voltages, as may well be the case, since the single turn nonwire-wound potentiometers generally have lower rated voltages then the gains of the operational amplifiers 48 and 50, then the amplifiers 48 and 50 gains can be correspondingly proportioned to produce steady state output voltages at the same levels. The equal output voltages from the amplifiers 48 and 50 applied to the positive and negative inputs of the operational amplifier 54 result in no output signal being fed to the summing junction 18. Accordingly, no error signal is generated at the summing junction 18 to be modulated and then amplified by the AC amplifier 20 for application to the phase winding 22 driving the two phase induction motor 24. In this initial state, the servosystem is thus balanced with the motor 24 at rest holding the recorder carriage with the stylus at the selected zero coordinate position.

With the system at this initial position, assume the position input signal conditioning circuit 10 receives an input signal at a low level either in digital form on the input lines 14, or in analogue form on the input 12 indicating a desired movement along the particular coordinate axis in the positive direction from the zero reference position. This input signal is conditioned by the circuit 10 for application at an appropriate level to the summing junction 18. Since there is initially no feedback signal to the summing junction 18 from the amplifier 54, the entire input through the resistor 16 appears as an error signal at the summing junction 18 having, for example, a negative potential. The modulation of this negative error signal by the transistor switching arrangement represented by the transistor 32, provides an alternating current excitation to the input phase winding 22 90° out of phase with the fixed excitation current in the other phase winding 26. The motor 24 is thus accelerated in the appropriate direction to drive the output shaft through the gears 36 moving the recorder carriage toward the positive coordinate position indicated by the position input signal.

As the carriage moves, the movable tap 38 on the followup potentiometer 40 also is driven in a clockwise direction from its initial zero position to supply an increasing positive output voltage to the input of the operational amplifier 48. At any instant, the level of this output voltage is directly related to the position of the carriage. The amplified output voltage is then applied through a phase lead network 52 to the positive input of the operational amplifier 54 to develop a feedback signal for application through a resistor 55 to the summing junction 18. The phase lead network 52, which conventionally consists of a resistor and a capacitor connected in parallel, provides a feedback signal voltage at the positive input of the amplifier 54 that has a first voltage component indicating the present position of the carriage, plus an additional voltage component proportional to the speed with which a carriage is being moved by the motor 24 resulting from the differentiating effect of the capacitor in the phase lead network 52. The feedback signal generated at the output of the differential amplifier 54 is then fed to the summing junction to reduce the magnitude of the error signal as the carriage approaches the position indicated by the input position signal. The additional component in this feedback signal supplied by the phase lead network 52 serves to further reduce the error signal insuring that the motor speed is gradually reduced as the carriage approaches the desired position, thus preventing overshoot.

When the recorder carriage has been driven to place the stylus at the desired position, the output voltage from the potentiometer 40 operates through the amplifiers 48 and 54 to supply a steady state feedback voltage to the summing junction 18 that exactly balances the input position signal from the amplifier 16. At this point, the error signal is again zero so that no driving current is supplied to the motor winding 22, thus holding the motor 24 stopped until the input position signal again changes.

If the amplitude of the positive input signal is then reduced, or a negative position input signal is applied initially with the system at the zero coordinate position, a positive error signal from the summing junction generates an alternating current signal at the input of the AC amplifier 20 exactly 180° out of phase with that resulting from the negative error signal. Thus, the amplifier 20 supplies an alternating current through the motor input phase winding 22 in opposite phase quadrature with the current through the other motor winding 26. The motor 24 then rotates in the opposite direction driving the carriage in the negative coordinate direction and the tap 38 counterclockwise to decrease the output voltage from the followup potentiometer 40. The differentiating effect of the phase lead network 52 provides an additional negative going voltage component in the feedback signal supplied to the summing junction 18 to reduce the error signal as before to prevent overshooting.

As will be appreciated by those skilled in the art, the operational amplifiers 48, 50 and 54 provide an active feedback network that operates to greatly improve the stability and accuracy of this system over previous systems of this type, particularly those operating with very low level inputs. The high input impedance of the operational amplifiers 48 and 50 substantially eliminate inaccuracies due to potentiometer loading and permits use of the low impedance, one turn potentiometers that have more linear output response and less undesirable transients during movement of the tap. Moreover, any transients which do appear in the output from the followup potentiometer 40 remain in proper proportion with the DC component of the output voltage since the output voltage level need not be severely attenuated to provide a feedback signal matching the low level position input signal at the summing junction 18. Thus, high frequency transients are not transmitted through the phase lead network 52 in the feedback path as in previous systems to reach the summing junction 18 at levels far higher than the attenuated DC output voltage at the tap 38.

Furthermore, since the error signal from the summing junction 18 is at a substantial voltage level, only moderate gain is required for the AC amplifier 20, as compared with the previously very high gain requirements necessitated by the very low level error signal of the prior systems. As a result, any transients appearing at the output of the summing junction 18 result in saturation of the AC amplifier 20 thus substantially improving the overall stability of the system.

It should be understood that the elements of the system have been illustrated schematically in simplified form in order to provide an overall understanding of its operation. Those skilled in the arts of servomechanisms and control systems are well aware of various specific circuit arrangements that might be utilized for performing each of the specific functions described herein in achieving the improved system response contemplated by this invention, and that may combine various circuit functions to produce the desired effects. For example, the summing junction and modulator operation might be provided by any number of different circuit arrangements specially suited to the nature of different circuit arrangements specially suited to the nature of the signals to be compared and the particular type of servomotor employed, such as a circuit for digitizing the error signal to operate a step motor.

Figure 2:
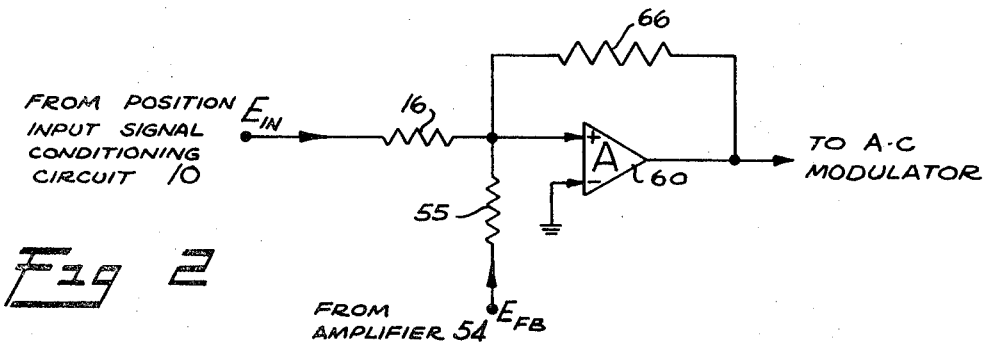
FIG. 2 is a circuit diagram of a preferred form of summing junction to be employed in the system of FIG. 1.

More specifically, referring now to FIG. 2, in one preferred form of the invention the summing junction 18 may employ an operational amplifier circuit arrangement as shown. This circuit is particularly useful because of its compatibility with the other operational amplifier circuit elements. In this arrangement, an operational amplifier 60 with high input impedance and high open loop gain has its positive input terminal connected to the common terminal between the input signal resistor 16 and the feedback signal resistor 55. The input signal $E_{IN}$ and the feedback potential $E_{FB}$ from the amplifier 54 have opposite polarities. Assuming that the input position signal voltage $E_{IN}$ and the feedback signal voltage $E_{FB}$ are developed with the same magnitude scale, the resistors 16 and 55 would have equal resistance values so that the error signal voltage at their common terminal would be midway between the position input and feedback voltage levels. Thus, when the amplitude of the input voltage matches that of the feedback voltage, the common terminal coupled to the positive input terminal of the operational amplifier 60 would be at zero or ground potential. Thus, since the negative input terminal of the amplifier 60 is connected to ground potential, there would be no voltage developed across its input terminals. When the input position and feedback voltage levels differ, an error voltage signal would appear at the amplifier input to generate an amplified error signal voltage for the modulator circuit. However, if the input and feedback voltages to the summing junction 18 are developed on different voltage scales, proper comparison could be achieved simply by selecting proportionally scaled resistance values for the input and feedback resistors 16 and 55. For example, the level of the feedback voltage from the amplifier 54 could be developed on a voltage scale twice that of the input position signal in which case the feedback resistor 55 need only be given twice the resistance value of the input resistor 16. The error signal voltage thus produced at the common terminal between the resistors 16 and 55 could then be amplified to an appropriate level for modulation by the operational amplifier 60 depending on the value of an amplifier feedback resistor 66 coupling its input and output terminals. As is well known, the gain of such an operational amplifier arrangement depends on the relative value of the amplifier feedback resistor 66 as compared to the resistors 16 and 55. If desired, either or both of the resistors 16 and 55 may have adjustable values to permit accurate compensation for any differences in the voltage scales of the input and feedback signals being applied to the summing junctions 18.

Figure 3:
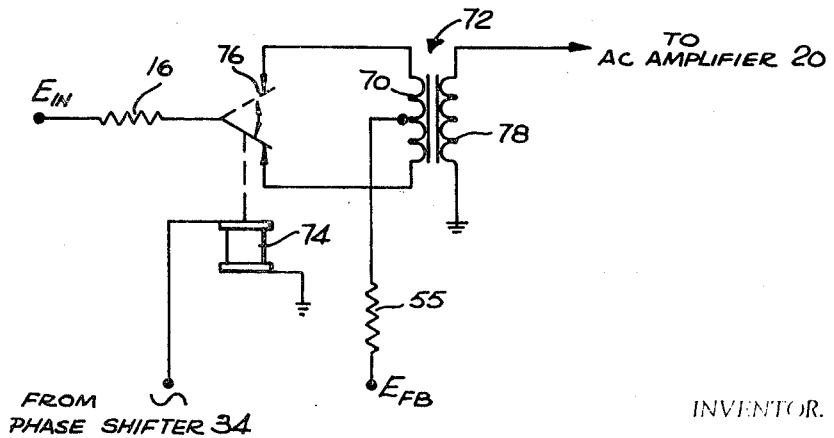
FIG. 3 is a schematic drawing showing a conventional balanced chopper arrangement that may be employed in the system of FIG. 1 to combine the summing junction and modulator functions.

Referring now to FIG. 3, instead of a separate summing junction and modulator for obtaining the desired AC error signal a conventional balanced chopper arrangement might be employed for combining these functions as in many prior servosystems. In this case the position input signal voltage $E_{IN}$ from the input conditioning circuit 10 is applied through resistor 16 to a solenoid controlled movable switch contact 68 of the chopper, while the feedback signal $E_{FB}$ developed on the same voltage scale is applied through resistor 55 to the midpoint of a primary winding 70 on a chopper transformer 72. A solenoid 74 is actuated by the alternating current from the 90° phase shifting circuit 34 to alternate the movable contact 68 between the fixed contacts 76 at opposite ends of the primary winding 70. Accordingly, a current flows first in one direction and then the other through opposite sides of the primary winding in accordance with the voltage difference between the position input and feedback potentials to generate an alternating current output in the secondary winding 78 to be fed to the AC amplifier 20.

What is claimed is:

1. An improved analogue recorder servosystem for positioning marking means relative to a recording medium in accordance with input signals indicative of a desired position comprising:

input signal conditioning means for providing an input signal level having a full scale range in the order of several volts;

servomotor means responsive to an applied error signal for causing relative movement of said marking member in a selected coordinate direction relative to said recording medium;

means for comparing said amplified input level with a feedback signal to generate an error signal for driving said servomotor toward the indicated position;

output means including a followup potentiometer with a tap coupled to be moved by said servomotor for generating an output voltage indicative of the instantaneous position of said marking means; and feedback network means including a phase lead network and first operational amplifier means having opposite polarity inputs with a high input impedance, said output voltage being coupled to one of said opposite polarity inputs through said phase lead network, a reference voltage source for establishing a fixed operating potential across said output potentiometer, and a zero reference potentiometer coupled across said reference source and having a movable tap for selectively establishing a preselected zero reference voltage for positioning said marking means on said recording medium in the absence of an input signal, the movable tap on said zero reference potentiometer being coupled to the other of said inputs of said operational amplifier means to provide a feedback signal equal to the difference between said zero reference voltage and a voltage produced by applying said output voltage through said phase lead network for developing a feedback voltage to be compared by said comparing means with said amplified input level to generate said error signal.

2. The system of claim 1 wherein said servomotor means includes a two-phase induction motor having first and second phase windings and a source of alternating current coupled to one of said phase windings; and said comparison means includes a modulator means for developing an alternating current signal having a frequency corresponding to that of said source and an amplitude proportional to said error signal and an alternating current amplifier having a relatively low gain for supplying said alternating current in either of two opposite phases, depending upon the polarity of said error signal, for driving said two-phase induction motor in one direction or the other at a speed proportional to the amplitude of said error signal.

3. The system of claim 1 wherein said feedback circuit means further includes a second and third operational amplifier means each having a high input impedance, the movable tap on said zero reference potentiometer being coupled to the input of said second operational amplifier means to generate said zero reference signal, said tap on said followup potentiometer being coupled to the input of said third operational amplifier means, the outputs of said second and third operational amplifier means being coupled as the inputs to said first operational amplifier means.

UNITED STATES PATENT OFFICE
CERTIFICATE OF CORRECTION

Patent No. 3,602,792　　　　　　　　　　　Dated August 31, 1971

Inventor(s)　Charles E. Engle

It is certified that error appears in the above-identified patent and that said Letters Patent are hereby corrected as shown below:

Column 3, line 68, after "terminal," insert -- of another operational amplifier 50 with its negative input terminal --.

Signed and sealed this 29th day of August 1972.

(SEAL)
Attest:

EDWARD M. FLETCHER, JR.　　　　　　　ROBERT GOTTSCHALK
Attesting Officer　　　　　　　　　　　Commissioner of Patents